Nov. 26, 1935.  A. D. PENTZ  2,022,254
VEHICLE BRAKE
Filed April 21, 1931   2 Sheets-Sheet 1
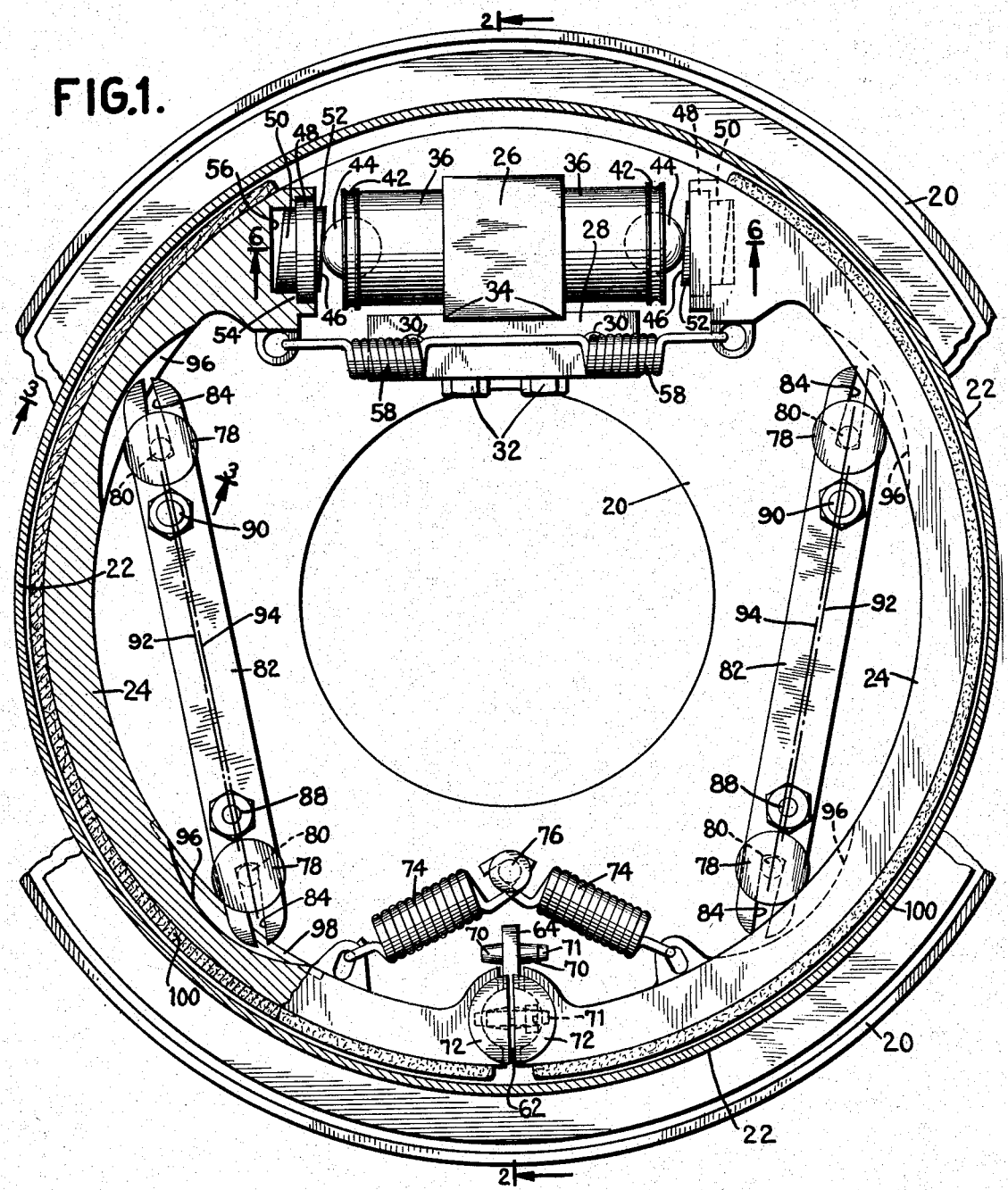
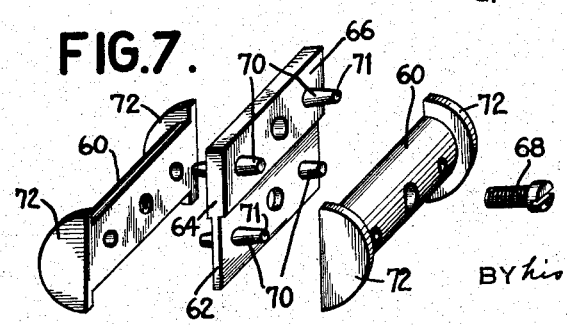
INVENTOR
Albert D. Pentz
BY his ATTORNEYS
Cooper, Kerr & Dunham

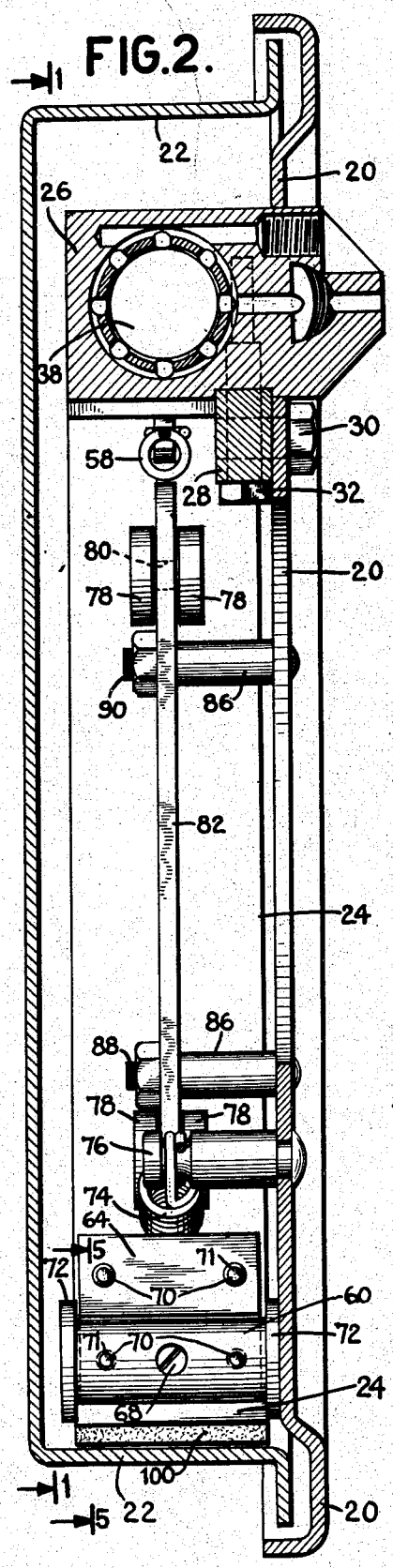
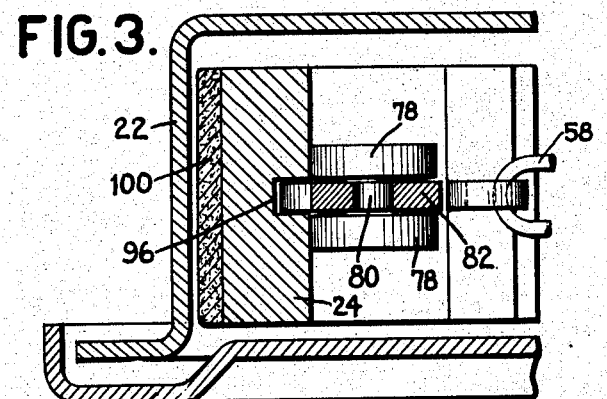
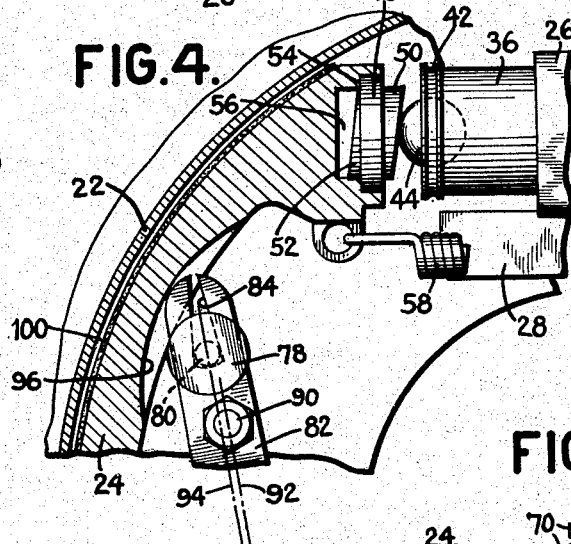
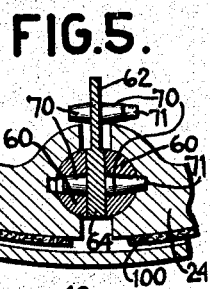
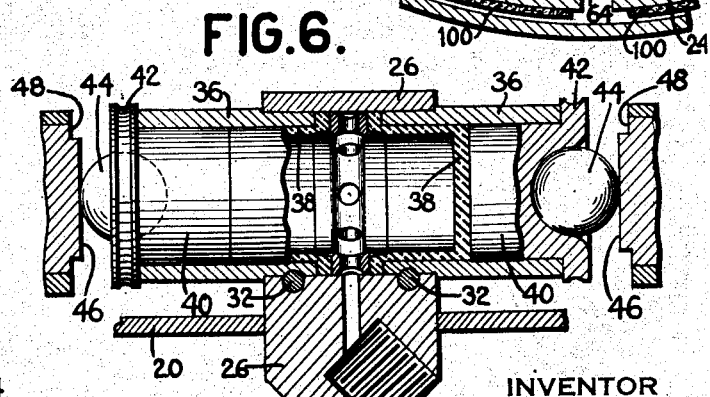

UNITED STATES PATENT OFFICE 2,022,254

VEHICLE BRAKE

Albert D. Pentz, New York, N. Y., assignor to Pentz Motor Brake Corporation, New Brighton, N. Y., a corporation of New York Application April 21, 1931, Serial No. 531,683

15 Claims. (Cl. 188—79.5)

This invention pertains to vehicle brakes, especially brakes adapted for use on automobiles.

In the use of such brakes the wear of drums and friction linings is comparatively rapid and the matter of adjustment for wear is of great importance. Unfortunately the devices heretofore provided for making adjustments have not been very well adapted for manipulation by the operators usually called upon to make the adjustments. There have been too many points susceptible of adjustment with nothing to guide the operator, the result being that after a few turns of a wrench here and there, the mechanism is so far out of proper position that the parts are never returned to their proper relationship.

The principal object, therefore, of the present invention is to provide means for making predetermined settings of the brake parts to compensate for the wear of linings and drums, thereby enabling the operator to make necessary adjustments with speed and certainty.

Another object of the invention is to provide improved devices for automatically controlling to a certain extent the relative amounts of wear of the different parts of the linings.

Further and other objects and advantages will be apparent from the specification and claims, and from the accompanying drawings which illustrate what is now considered the preferred embodiment of the invention.

In the drawings:

Fig. 1 is a side view on line 1—1 of Fig. 2.

Fig. 2 is a section on line 2—2 of Fig. 1.

Fig. 3 is an enlarged detail cross-section on line 3—3 of Fig. 1.

Fig. 4 is a view of the upper left corner of Fig. 1 after adustments have been made for thinner lining.

Fig. 5 is a detail view on line 5—5 of Fig. 2 after adjustments have been made for thinner lining.

Fig. 6 is a cross-section through the operating cylinder, on line 6—6 of Fig. 1.

Fig. 7 is an exploded view of the hinge device between the shoes.

In the drawings the stationary apron is designated 20, and the brake drum adapted for rotation is 22. Within the drum is a brake band comprising two similar shoes 24, hinged together at the bottom and spaced apart at the top of the drum to accommodate between their ends a hydraulic thrust device secured to the apron.

The thrust device comprises a body member 26, extending through a close-fitting square hole in the apron, and secured thereto by a block 28 bolted to the apron by screws 30, and to the body 26 by screws 32. For additional security, body 26 is notched into block 28 as at 34 (Fig. 1). Held in body 26 by screws 32 are the oppositely projecting cylinders 36 containing expansible members 38 which serve to force pistons 40 outwardly in well known manner. Each piston 40 has a stop flange 42 adapted to abut the end of its cylinder 36, and each piston has in its outer end a ball 44 in position to thrust against the upper end of a shoe 24 through the instrumentality of a thrust block 46 set into the shoe. Each block 46 comprises a collar 48 and a boss projecting from each side of the collar. One boss 50 is of greater height than the other boss 52, and the faces of the bosses may be inclined as shown in the drawings. Each thrust block 46 is set in operative position with the rim of collar 48 against shoulder 54, with one boss 50 or 52 in contact with its associated thrust ball 44 and the other boss projecting idly into counterbore 56. Spring 58 ties together the upper ends of the shoes and serves as a restoring agency to retract plungers 40 to normal positions with collars 42 against cylinders 36 whenever the brake is released.

The lower ends of shoes 24 are hinged to each other on a substantially cylindrical structure which comprises (Fig. 7) a pair of half cylinders 60 having between them either the thin portion 62 or thick portion 64 of a plate 66. A screw 68 serves to hold the hinge assembly together, while dowel pins 70 serve to hold the parts in proper alignment, and to prevent rotation of the hinge structure with reference to one of the shoes (Fig. 5). For this purpose one end of each pin is made long enough, as at 71, to enter a suitable recess in one of the shoes. Flanges 72 restrain the shoes against undue endwise movement on the hinge.

Springs 74, anchored on apron 20 at 76 hold the two shoes against the hinge pin, and, acting with spring 58 they serve to hold the shoes against rollers 78 while the brake is in normal position.

Rollers 78 are in pairs with a hub 80 between them (Fig. 3). Each pair of the rollers is supported for rotation near the end of a supporting member which may be a flat bar 82. For ease of assembly, each bar 82 is slotted at its ends as at 84 to receive a hub 80 and then the ends of the bar are pinched together to partially close the slots to retain the rollers in the bottoms of the slots.

Each bar 82 is held fast on a pair of studs 86 set into apron 20. The reduced outer end 88 and 90 of the studs pass snugly through suitable holes in plates 82, the holes being on a line 92 which is parallel to, but spaced from, line 94 joining the centers of rollers 78. Pins 88 are of different diameters from pins 90 in order to make is impossible to place bars 82 wrong end up.

The free ends of bars 82 enter longitudinal slots 96 in shoes 24 to prevent undue sidewise displacement of the shoes. Rollers 78 contact with the inner surface of the shoes on each side of slots 96. If desired, hardened bearing plates 98 may be placed on the shoes under rollers 78.

Shoes 24 are faced with friction linings 100, the thickness of which, when new, being indicated in Fig. 1. In that figure all adjustments are made to accommodate the thick lining, i. e. thin plate 62 is in operative position in the hinge, thin thrust bosses 52 are operative against thrust balls 44, and stop bars 82 are set so that their lesser widths (from line 92) are in operative positions towards the shoes. In other words, all adjustments are such that shoes 24 are retracted inwardly towards the brake center sufficiently to provide space for the thick lining.

When the lining wears in service sufficiently to require adjustment, the operator simply reverses the hinge plate so that thick portion 64 is in operative position (Fig. 5), reverses stop plate 82 so that their greater widths (from line 92) are towards the shoes (Fig. 4), (thus moving rollers 78 outwardly) and reverses thrust blocks 46 so that their higher bosses 50 are turned towards the thrust balls 44 (Fig. 4). The above adjustments move the home position of shoes 24 outwardly and place the working surfaces of linings 100 back to their original positions where they were when the linings were new.

When the lining again wears sufficiently to make adjustment again necessary it is replaced by new lining of normal thickness and the adjustable parts are placed again in their original position as in Fig. 1.

In addition to providing a means for adjustment as above described, plates 82 are so positioned that rollers 78 supported thereby, serve to support and properly position shoes 24 when they are retracted by springs 58 and 74.

It is sometimes found that the brake linings do not wear alike at the upper ends of the shoes on either side of the hydraulic cylinder, therefore thrust bosses 50, 52 are provided with inclined faces in contact with thrust balls 44. This has the effect of increasing or decreasing the radial outward pressure of the upper lining against the drum as compared with what it would be if the boss faces were vertical. It has been found, also, that the use of inclined thrust block faces may have a marked effect on the smoothness of application of the brake in service. Furthermore, the inclined thrust faces serve to automatically take up some of the lost motion between lining and drum as the lining wears. For instance, when the lining wears on the upper side of the right hand shoe (Fig. 1), that shoe will be closer to the drum surface whenever the brake is applied the drum rotating counter-clockwise, thus bringing a thicker portion of plug 46 into contact with thrust ball 44.

It is to be understood that the invention is not limited to the specific embodiment herein illustrated and described but may be used in other ways without departure from its spirit as defined by the following claims.

I claim:

1. In a vehicle brake, in combination, a drum, an apron, a shoe having a retracted position relatively to said drum, and means comprising a member rigidly supported on said apron for controlling the retracted position of said shoe at widely separated points on said shoe.

2. In a vehicle brake, in combination, a drum, a shoe having a retracted position relatively to said drum, means including a rigidly supported member for controlling the retracted position of said shoe at widely separated points on said shoe and means for making a predetermined adjustment of said member to simultaneously adjust said retracted position at said widely separated points.

3. In a vehicle brake, in combination, a drum, a shoe having a retracted position relatively to said drum, and means including a rigidly supported member for controlling the retracted position of said shoe at widely separated points on said shoe, said member being reversible in position to provide at least two predetermined retracted positions for said shoe.

4. In a vehicle brake, in combination, a drum, a shoe having a retracted position relatively to said drum, means including a rigidly supported member for controlling the retracted position of said shoe at widely separated points on said shoe and rollers carried by said member to bear on said shoe at said widely separated points.

5. In a vehicle brake, in combination, a drum, a shoe having a retracted position relatively to said drum, and means including a rigidly supported member for controlling the retracted position of said shoe at widely separated points on said shoe, said member being adapted to engage said shoe at said widely separted points to limit the sidewise movements of said shoe.

6. In a vehicle brake, in combination, a drum, a shoe having slots therein at widely separated points on its inner surface, a bar having its ends in said slots, means for retracting said shoe and means for rigidly supporting said bar in at least two predetermined positions whereby the retracted position of said shoe may be varied at the will of the operator.

7. The invention set forth in claim 6 in which rollers are carried by said bar to bear on said shoe adjacent said slots when the shoe is in retracted position.

8. The invention set forth in claim 6 in which rollers are carried by said bar to bear on said shoe adjacent said slots when the shoe is in retracted position, said rollers being in pairs with a hub between, and each bar being slotted at its ends to receive and retain one of said hubs, substantially as described.

9. In a vehicle brake, in combination, a drum having shoes, means for hinging said shoes to each other, means for applying said shoes to said drum, and means including a plate having at least two optional operative thicknesses for making predetermined adjustments of said hinge means to compensate for wear of the operative surfaces of said shoes.

10. In a vehicle brake, in combination, a drum, a shoe within said drum, means for thrusting said shoe into operative position against said drum, means for retracting said shoe from said drum, and means for making predetermined adjustments between said thrust means and said shoe whereby the retracted position of said shoe may be varied at the will of the operator, said adjusting means comprising a reversible thrust member set into said shoe, the adjustment depending on the position of the thrust member in said shoe.

11. In a vehicle brake, in combination, a drum, a shoe within said drum, means for thrusting said shoe into operative position against said drum, means for retracting said shoe from said drum, and means for making predetermined adjustments between said thrust means and said shoe whereby the retracted position of said shoe may be varied at the will of the operator, said adjusting means comprising a reversible thrust member set into said shoe and said member having an inclined surface whereby the resultant direction of thrust on said shoe may be controlled.

12. In a vehicle brake, in combination, a brake drum, a pair of shoes within the drum, means for hinging adjacent ends of said shoes together, means for thrusting the other ends of said shoes apart to force them into operative contact with said drum, means for retracting said shoes, means for supporting each of said shoes at widely separated points while they are retracted, and means for making predetermined adjustments of said hinge means, said thrust means and said supporting means to compensate for wear of the operative surfaces of said shoes.

13. In a vehicle brake, in combination, a drum having shoes, means for hinging said shoes to each other, means for applying said shoes to said drum, and means for making predetermined adjustments of said hinge to compensate for wear of the operative surfaces of said shoes; said hinging means comprising semi-cylindrical recesses in the adjacent ends of said shoes, a semi-cylindrical member in each of said recesses, a plate between said members and pins for holding said plate and said members in operative relationship; said holding means serving the additional purpose of holding said hinged structure and said hinged shoes in proper relationship.

14. In a vehicle brake, in combination, a drum having shoes, means for hinging said shoes to each other, means for applying said shoes to said drum, and means for making predetermined adjustments of said hinge to compensate for wear of the operative surfaces of said shoes; said hinging means comprising semi-cylindrical recesses in the adjacent ends of said shoes, a semi-cylindrical member in each of said recesses, a plate between said members and pins for holding said plate and said members in operative relationship.

15. In a vehicle brake, in combination, a drum having shoes, means for hinging said shoes to each other, means for applying said shoes to said drum, and means for making predetermined adjustments of said hinge to compensate for wear of the operative surfaces of said shoes; and said hinging means comprising semi-cylindrical recesses in the adjacent ends of said shoes, a semi-cylindrical member in each of said recesses, a plate between said members, and means for holding said plate and said members in operative relationship, said plate having portions of different thickness either of which portion may be placed between said members substantially as described.

ALBERT D. PENTZ.